(12) United States Patent
Tanaka et al.

(10) Patent No.: US 6,733,832 B2
(45) Date of Patent: May 11, 2004

(54) PROCESS FOR FORMING MULTICOLOR PATTERN COATING FILM (75) Inventors: Shoichi Tanaka, Chigasaki (JP); Makoto Kikuta, Yokohama (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 79 days.

(21) Appl. No.: 10/183,501

(22) Filed: Jun. 28, 2002

(65) Prior Publication Data

US 2003/0049369 A1 Mar. 13, 2003

(30) Foreign Application Priority Data

Jun. 29, 2001 (JP) .......................................... 2001-198313

(51) Int. Cl.[7] ................................................. B32B 7/00
(52) U.S. Cl. .................... 427/257; 427/265; 427/385.5; 427/421; 427/427; 428/411.1
(58) Field of Search ................................ 427/257, 265, 427/385.5, 421, 427; 428/411.1

Primary Examiner—Bernard Pianalto
(74) Attorney, Agent, or Firm—Wenderoth, Lind & Ponack, L.L.P.

(57) ABSTRACT

The present invention provides a process for forming a matted multicolor pattern coating film having a 60 degree specular gloss of 10 or less by spray-coating and baking plural coating materials having different colors on a moving strip coated article, wherein the above respective coating materials are shrunk matted coating film-forming coating materials each comprising (A) a hydroxyl group-containing organic resin, (B) a low nuclidic methylated melamine resin, (C) a reaction mixture of 1 mole of a sulfonic acid compound and 1.5 mole or more of an amine compound and (D) a color pigment; and in carrying out spray coating, two or more spray-coating apparatuses having two or more coating material-discharging nozzles are used, and coating materials having coating colors which are different from each other are discharged from at least two coating material-discharging nozzles of the above respective spray-coating apparatuses to form a plural number of unit plural color spray patterns in which the above coating materials having different coating colors are present in a mixture.

19 Claims, 2 Drawing Sheets

PROCESS FOR FORMING MULTICOLOR PATTERN COATING FILM

The present invention relates to a process for forming a multicolor pattern coating film by spray coating which can form a matted multicolor pattern coating film even in high-speed coating such as coil coating.

In spray-coating a moving coated article, it is coated while reciprocating a spray gun to a large extent in a lateral direction of the moving coated article, so that the coating locus is largely zigzagged. Accordingly, if a moving speed of the moving coated article is accelerated usually to 4 m/minute or more, caused is the problem that a non-coated part is produced on the coated article or a thickness of the coating film is scattered to a large extent.

In forming multicolor patterns on a coated article, scattering in the patterns brought about by scattering in a coating film thickness is notably produced, and therefore it is particularly required to decrease scattering in the coating film thickness. Further, it is considered to elevate a reciprocating speed of a spray gun to prevent producing of a non-coated part and scattering in a coating film thickness. However, if the reciprocating speed is increased, a direct advance of coating material particles discharged from a nozzle is varied to a large extent depending on a size of the coating material particles, so that caused is the problem that disturbance is produced on the patterns.

Disclosed as one mean for solving the problems described above in Japanese Patent Application Laid-Open No. 296357/2000 is a process for forming a multicolor pattern coating film which is uniform and has an excellent decorativeness by spray coating in high-speed coating such as coil coating, wherein two or more spray-coating apparatuses having two or more coating material-discharging nozzles are used, and coating materials having coating colors which are different from each other are discharged from at least two coating material-discharging nozzles of the above respective spray-coating apparatuses to form a plural number of unit plural color spray patterns in which the above coating materials having different coating colors are present in a mixture, whereby spray coating is carried out on a coated article so that the respective unit multicolor patterns constituted by a plural number of the above unit plural color spray patterns are partially superposed on unit multicolor patterns constituted by unit plural color spray patterns adjacent thereto.

The problems described above can be solved by this process, but when a multicolor pattern coating film is a low lustrous matted coating film containing a large amount of an extender pigment such as silica, involved therein are the problems that the multicolor pattern coating film formed is not satisfactory in a color-transfer resistance and a stain resistance against an oil-based ink and that a difference in a weather resistance between the respective colors in the multicolor patterns is large and the multicolor pattern coating film is reduced in appearance with the passage of time to a large extent.

An object of the present invention is to provide a process for forming by spray coating, a matted multicolor pattern coating film which is uniform and has an excellent decorativeness and which is excellent in a color-transfer resistance, a stain resistance against an oil-based ink and a weather resistance.

The present inventors have found that a multiple and multicolor pattern can be formed by using two or more spray-coating apparatuses having two or more coating material-discharging nozzles using matted coating film-forming coating materials prepared by blending a resin system of a hydroxyl group-containing resin and a low nuclidic methylated melamine resin with a reaction mixture of a sulfonic acid compound and an excess amount of an amine compound and by superposing a part of the respective multicolor patterns formed by plural spray patterns on multicolor patterns formed by other plural spray patterns and that the object described above can be achieved, and they have come to complete the present invention.

Thus, the present invention provides a process for forming a shrunk matted multicolor pattern coating film having a 60 degree specular gloss of 10 or less determined according to JIS K5400 7.6 (1990) by spray-coating and baking plural coating materials having different colors on a moving strip coated article, wherein the above plural coating materials are shrunk matted coating film-forming coating materials each comprising:

a resin composition containing
  (A) 60 to 95 parts by weight of a hydroxyl group-containing organic resin and
  (B) 5 to 40 parts by weight of a low nuclidic methylated melamine resin in such a proportion that the amounts of these both components sum up to 100 parts by weight,
  (C) a reaction mixture of 1 mole of a sulfonic acid compound and 1.5 mole or more of at least one amine compound having a boiling point falling in a range of 30 to 250° C. and selected from secondary amines and tertiary amines in an amount of 0.1 to 3 parts by weight in terms of an amount reduced to the above sulfonic acid compound per 100 parts by weight of the above resin composition, and
  (D) a color pigment; and
in carrying out spray coating,
  (i) two or more spray-coating apparatuses having two or more coating material-discharging nozzles are used, and the respective coating material-discharging nozzles are disposed toward a coated article face;
  (ii) coating materials having coating colors which are different from each other are discharged from at least two coating material-discharging nozzles of the above respective spray-coating apparatuses to form a plural number of unit plural color spray patterns in which the above coating materials having different coating colors are present in a mixture; and
  (iii) thus, the respective unit multicolor patterns constituted by a plural number of the above unit plural color spray patterns are partially superposed on unit multicolor patterns constituted by unit plural color spray patterns adjacent thereto on the coated article to form multiple multicolor patterns covering the whole width of the coated article.

Further, the present invention provides a matted multicolor pattern coating film-forming coated plate obtained by the process for forming a multicolor pattern coating film described above.

BRIEF DESCRIPTION OF THE DRAWINGS

In the drawings attached.

The present invention shall be explained below in further details.

In the process for forming a matted multicolor pattern coating film according to the present invention, plural shrunk matted coating film-forming coating materials having different coating colors are used. The respective matted coating film-forming coating materials used comprise the hydroxyl group-containing organic resin (A), the low nuclidic methylated melamine resin (B), the reaction mixture (C) of a sulfonic acid compound and an amine compound and the color pigment (D).

Hydroxyl Group-containing Organic Resin (A)

Any resins can be used as the hydroxyl group-containing organic resin (A) which is a base resin component in the matted coating film-forming coating material without any specific restrictions as long as they are organic resin for coating materials containing hydroxyl groups. The hydroxyl group-containing organic resin has a hydroxyl group value falling suitably in a range of usually 5 to 110 mg KOH/g, particularly 10 to 80 mg KOH/g in terms of a solvent resistance and a processability. Capable of being given as the kind of the resin are, for example, polyester resins, acrylic resins and fluororesins. Among them, hydroxyl group-containing polyester resins can suitably be used.

The hydroxyl group-containing polyester resin described above includes oil-modified polyester resins, oil-free polyester resins, acryl-modified polyester resins and silicon-modified polyester resins which are usually used as polyester resins for a coating material. These hydroxyl group-containing polyester resins have preferably a number average molecular weight falling in a range of usually 600 to 30,000, particularly 1,000 to 25,000. These polyester resins each can be used alone or in combination of two or more kinds thereof.

Low Nuclidic Methylated Melamine Resin (B)

The low nuclidic methylated melamine resin (B) which is a cross-linking agent component in the matted coating film-forming coating material is a low nuclidic melamine resin having a methoxy group given by methylation, and it is a melamine resin having substantially no NH group and an average condensation degree (average triazine nucleus number) of 2.5 or less and containing 4 or more alkoxy groups, particularly 4.5 to 6 groups on average per one triazine nucleus and among them, 2.5 or more methoxy groups, particularly 4 to 6 groups. Particularly preferred is a melamine resin containing 40% by weight or more of a hexamethoxymethylmelamine mononuclide. The alkoxy group which can be coexistent with methoxy includes $C_2$ to $C_6$ alkoxy groups such as ethoxy, n-propoxy, isopropoxy, n-butoxy and isobutoxy.

The low nuclidic methylated melamine resin (B) is already known, and capable of being used are, for example, commercial products such as Cymel 300, Cymel 303, Cymel 370, Cymel 232, Cymel 235, Cymel 238 and Cymel 272 (all described above are brand names, manufactured by Mitsui Cytec Co., Ltd.), Nikarac MW30 and Nikarac MW22A (all described above are brand names, manufactured by Sanwa Chemical Co., Ltd.), Sumimal M100 (brand name, manufactured by Sumitomo Chemical Ind. Co., Ltd.) and Resimine 747, Resimine 745 and Resimine 755 (all described above are brand names, manufactured by Monsanto Co., Ltd.).

These low nuclidic methylated melamine resins (B) cause a sufficient curing reaction with the hydroxyl group-containing organic resin (A) in the presence of a strong acid catalyst by baking for short time, but when the strong acid catalyst is not present, they do not usually cause a sufficient curing reaction with the hydroxyl group-containing organic resin (A) by baking for short time. The low nuclidic methylated melamine resins described above each can be used alone or in combination of two or more kinds thereof.

In respect to a blending proportion of the hydroxyl group-containing organic resin (A) and the low nuclidic methylated melamine resin (B), from the viewpoints of a curing property and a solvent resistance, a corrosion resistance and a processability of the resulting coating film, the component (A) falls suitably in a range of 60 to 95 parts by weight, preferably 70 to 92 parts by weight, and the component (B) falls suitably in a range of 5 to 40 parts by weight, preferably 8 to 30 parts by weight in terms of a resin solid matter each based on 100 parts by weight of the total of both resin solid matters.

Reaction Mixture (C) of a Sulfonic Acid Compound and an Amine Compound

The matted coating film-forming coating material used in the present invention contains as a curing catalyst, the reaction mixture (C) of a sulfonic acid compound and a large excess equivalent of at least one amine compound having a boiling point falling in a range of 30 to 250° C. and selected from secondary amines and tertiary amines.

This reaction mixture (C) can readily be obtained by mixing a sulfonic acid compound and an amine, for example, at room temperature. In producing the matted coating film-forming coating material, the component (C) may be blended in the form of a reaction mixture obtained by mixing and reacting a sulfonic acid compound in advance with an amine compound in a prescribed proportion, or the sulfonic acid compound and the amine compound each may be separately blended with the coating material. Or, a reaction mixture of the sulfonic acid compound and a part of the amine compound and the remaining amine compound each may be separately blended with the coating material.

The sulfonic acid compound is temporarily suppressed in a catalytic action thereof by forming an amine salt with a secondary amine or a tertiary amine, but the sulfonic acid compound is intrinsically a catalyst which accelerates a curing reaction between the hydroxyl group-containing organic resin (A) and the low nuclidic methylated melamine resin (B) and acts as a curing catalyst on the surface layer part of the coating film by volatilization of the amine compound from the surface of the coating film in baking the coating film. On the other hand, the amine compound is delayed in volatilization in the inside of the coating film, and a large amount of the amine compound remains in an initial stage of baking, so that the action thereof as a curing catalyst is suppressed. It is considered that this produces a large difference in time between curing on the surface of the coating film and curing in the inside thereof and forms a matted coating film on the surface of the coating film by shrunk patterns.

The sulfonic acid compound described above includes, for example, alkylarylsulfonic acids such as dodecylbenzenesulfonic acid, dinonylnaphthalenedisulfonic acid, dinonylnaphthalenesulfonic acid and paratoluenesulfonic acid; and alkylsulfonic acids such as methanesulfonic acid. They each can be used alone or in combination of two or more kinds thereof.

The secondary or tertiary amine compound used for forming a salt with the sulfonic acid compound has a boiling point falling in a range of 30 to 250° C., preferably 50 to 230° C., and to be specific, capable of being given are, for example, secondary amines such as diethylamine, diisopropylamine, di-n-propylamine, dialylamine, diamylamine, di-n-butylamine, diisobutylamine, di-secbutylamine, N-ethyl-1,2-dimethylpropylamine, N-methylhexylamine, di-n-octylamine, piperidine, 2-pipecoline, 3-pipecoline, 4-pipecoline, 2,4-,2,5- or 3,5-lupetidine, dimethyloxazolidine and 3-piperidinemethanol; and tertiary amines such as triethylamine, N-methylmorpholine, N,N-dimethylallylamine, N-methyldiallylamine, triallylamine, N,N,N',N'-tetramethyl-1,2-diaminoethane, N,N,N',N'-tetramethyl-1,3-diaminopropane, N-methylpiperidine and pyridine. Among them, dimethyloxazolidine and dialkylamines, particularly diisopropylamine, di-n-propylamine, di-n-butylamine and diisobutylamine are preferred since they have low odor and form beautiful shrinkage.

A mixing ratio of the amine compound to the sulfonic acid compound in the component (C) described above falls suitably in a range of 1.5 or more, preferably 4 to 30 and more preferably 6 to 20 in terms of a mole ratio of the amine compound/the sulfonic acid compound from the viewpoint of a matted coating film-forming property provided by shrunk patterns.

A blending amount of the reaction mixture of the sulfonic acid compound and the amine compound which is the component (C) to the coating material falls suitably in a range of 0.1 to 3 parts by weight, preferably 0.2 to 2 parts by weight in terms of an amount reduced to that of the sulfonic acid compound per 100 parts by weight of the total of the component (A) and the component (B) from the viewpoint of a curing property, a water resistance and a moisture resistance of the coating film. In the present specification, the term "an amount reduced to that of the sulfonic acid compound" means an amount of the sulfonic acid compound constituting the reaction mixture.

Color Pigment (D)

Conventionally known color pigments used for conventional coating materials can be used as the color pigment (D) blended with the matted coating film-forming coating material.

The specific examples of the color pigment (D) include, for example, red pigments such as Karmin FB, dinitroaniline orange, pyrazolone orange, pyrazolone red, perynone orange, Permanent Red 2B, Lake Red R, Bon Maroon Light, Bordeaux 10B, Bon Maroon Medium, Thioindigo Bordeaux, Bon Maroon L, perylene vermilion, perylene scarlet, perylene maroon, benzimidazolone orange, chrome vermilion-molybdenum red, red iron oxide, toluidine red and γ type quinacridone red; blue pigments such as cyanine blue pigment blur 15, ditto 15:1, ditto 15:2, ditto 15:3, ditto 15:4, non-metal cyanine blue, indathrene blue, Prussian blue, ultramarine and cobalt blue; yellow pigments such as monoazo yellow pigments, diazo yellow pigments, condensed azo yellow pigments, isoindolinone yellow pigments, threne base yellow pigments, metal complex yellow pigments, quinophthalone yellow, isoindolinone yellow, chrome yellow, yellow iron oxide and Titan Yellow; black pigments such as carbon black, pine soot, graphite and black iron oxide; white pigments such as titanium white and zinc white; green pigments such as cobalt green, cyanine green, brominated green and titanium-nickel-cobalt-zinc base green; purple pigments such as cobalt violet, manganese violet, dioxazine violet and β type quinacridone violet; and brilliant pigments such as micaceous iron oxide powder, pearly mica powder, aluminum powder, bronze powder, copper powder, stainless steel powder and nickel powder. These color pigments can be blended alone or in combination of two or more kinds thereof.

A blending amount of the color pigment shall not specifically be restricted and can be varied depending on the kind of the color pigment and the desired coating color, and usually it falls preferably in a range of 5 to 120 parts by weight, particularly 8 to 100 parts by weight per 100 parts by weight of the total of the component (A) and the component (B).

The respective matted coating film-forming coating materials used in the process of the present invention comprise the components (a), (B), (C) and (D) described above as the essential components, and usually they contain an organic solvent and can further contain, if necessary, silica fine powder, an aggregate; an extender pigment such as talc, clay, mica, alumina and silica-alumina ceramic powder; a rust preventive pigment such as strontium chromate and zinc chromate; and other additives for a coating material.

The silica fine powder described above is preferably silica fine powder having an average particle diameter of usually 10 μm or less, preferably 0.5 to 8 μm, and blending this makes it possible to elevate a corrosion resistance of the shrunk coating film, particularly a corrosion resistance in a concave part and a cut part. The particle diameter in the present specification is the particle diameter in the state that the powder is dispersed in the coating material, and it is called a so-called secondary particle diameter. The silica fine powder described above may be produced by either process of a wet process and a dry process and may be subjected to treatment such as surface coating. Usually, the silica fine powder is blended suitably in a range of 15 parts by weight or less, preferably 1 to 10 parts by weight per 100 parts by weight of the total of the component (A) and the component (B) from the viewpoint of a corrosion resistance, a weather resistance and a color-transfer resistance of the coating film.

The representative examples of the silica fine powder include in terms of brand names, for example, Aerosil 200, ditto 300, ditto 380 and ditto TT600 (all manufactured by Nippon Aerosil Co., Ltd.), Cyloid 74, ditto 83, ditto 161, ditto 162, ditto 244, ditto 308 and ditto 378 (all manufactured by Fuji Silician Chemical Co., Ltd.), Mizukasil P-526, ditto P-527, ditto P-801 and ditto NP-8 (all manufactured by Mizusawa Chemical Co., Ltd.), Nipseal E200A and ditto E220 (all manufactured by Nippon Silica Co., Ltd.), Fineseal E-50, ditto E-70, ditto T-32 and ditto X-37 (all manufactured by Tokuyama Soda Co., Ltd.) and Carplex #67 and ditto #80 (all manufactured by Shionogi Pharmaceutical Co., Ltd.).

The aggregate described above which is blended, if necessary, into the respective matted coating film-forming coating materials is added for elevating a pattern stability of the shrunk pattern coating film formed and raising more a decorativeness thereof, and it can be at least one combination of (a) an organic resin particle having an average particle diameter of 2 to 70 μm, preferably 5 to 30 μm, (b) an organic resin fiber having a diameter of 2 to 50 μm and a length of 30 μm to 5 mm, preferably a diameter of 3 to 30 μm, a length of 50 μm to 3 mm and a length/diameter ratio of 2/1 to 100/1, (c) a glass particle having an average particle diameter of 2 to 70 μm, preferably 5 to 30 μm and (d) an inorganic fiber having a diameter of 2 to 50 μm and a length of 10 μm to 5 mm, preferably a diameter of 3 to 30 μm, a length of 30 μm to 3 mm and a length/diameter ratio of 2/1 to 100/1 or a combination of two or more kinds thereof.

It is required to the aggregate described above that it is not dissolved in a solvent contained in the coating material and is not completely molten at a coating film-forming temperature (that is, a coating film-curing condition in a practical coating line). The term "not completely molten" not only includes the state that it is not molten at all but also means the state that it is partially molten and the individual particles and the peripheral surface of the fiber are covered with the molten matter.

The organic resin particle in the component (A) described above includes, for example, resin particles of polyolefins such as polyethylene and polypropylene; acrylic resins such as polyacrylonitrile and polymethyl methacrylate; fluorine-containing resins such as polytetrafluoroethylene and polyvinylidene fluoride; polyamide resins such as nylon 11 and nylon 12; amino resins such as benzoguanamine resins and melamine resins; silicon resins, urethane resins, polyester resins, polystyrenes, phenol resins, epoxy resins and cellulose. The organic resin fiber (b) described above includes fibers of polyester resins, acrylic resins, polyamide resins and cellulose.

The glass particle (c) described above includes silicate glass and may be hollow. The inorganic fiber (d) described above includes fibers of glass, potassium titanate, carbon and basic magnesium sulfate. Among the aggregates of (a), (b), (c) and (d) described above, the aggregates of (a) and/or (b) are preferably used from the viewpoint that soft touch is obtained.

Blending of the aggregate described above into the coating is material makes it possible to elevate a pattern stability (evenness-revealing property of pattern) of the coating film formed and give a change to the patterns to elevate more a decorativeness thereof. Particles having a particle diameter of 5 $\mu$m or more and fibers having a diameter of 5 $\mu$m or more are preferred as the aggregate described above since a change can readily be given to the patterns. The aggregate described above is suitably blended in a range of 30 parts by weight or less, preferably 5 to 15 parts by weight per 100 parts by weight of the total of the component (A) and the component (B) from the viewpoint of a weather resistance, a color-transfer resistance and a processability of the coating film.

In the process of the present invention, the matted coating film-forming coating material described above is spray-coated on a strip coated article moving at a speed of 10 m/minute or more, preferably 10 to 150 m/minute and more preferably 20 to 80 m/minute and cured by baking, whereby formed is a shrunk matted multicolor pattern coating film having a 60 degree specular gloss of 10 or less determined according to JIS K5400 7.6 (1990).

According to the present invention, spray coating can be carried out by:

(i) using two or more spray-coating apparatuses having two or more coating material-discharging nozzles and disposing the respective coating material-discharging nozzles toward a coated article face, (ii) discharging coating materials having coating colors which are different from each other from at least two coating material-discharging nozzles of the above respective spray-coating apparatuses to form a plural number of unit plural color spray patterns in which the above coating materials having different coating colors are present in a mixture, and (iii) thus, partially superposing the respective unit multicolor patterns constituted by a plural number of the above unit plural color spray patterns on unit multicolor patterns constituted by unit plural color spray patterns adjacent thereto on the coated article to form multiple multicolor patterns covering the whole width of the coated article.

The spray-coating apparatuses having two or more coating material-discharging nozzles used in the process of the present invention include, for example, a multi nozzle spray gun and a multi head spray gun.

The multi nozzle spray gun described above is a coating apparatus having one coating gun head and two or more coating material-discharging nozzles close to each other in the above coating gun head. Coating materials having coating colors which are different from each other are discharged from the respective coating material-discharging nozzles of the multi nozzle spray gun, whereby plural color spray patterns in which the above coating materials having different coating colors are present in a mixture can be formed.

Capable of being given as the multi nozzle spray gun is, for example, a spray gun described in Japanese Patent Application Laid-Open No. 299833/1997. The nozzles of the multi nozzle spray gun may be put in any position as long as the coating materials having different coating colors discharged from the respective nozzles can be mixed to form an even pattern coating material layer on the coated article. For example, two or more nozzles may separately be disposed or the respective nozzles may be disposed integrally in a concentric circle form, and the nozzles in the inside and the doughnut-shaped nozzles in the outside may be formed.

An example of a spray-coating apparatus in the case where two or more nozzles are independently disposed shall be explained with reference to FIG. 1 and FIG. 2 described later.

Figure 1:
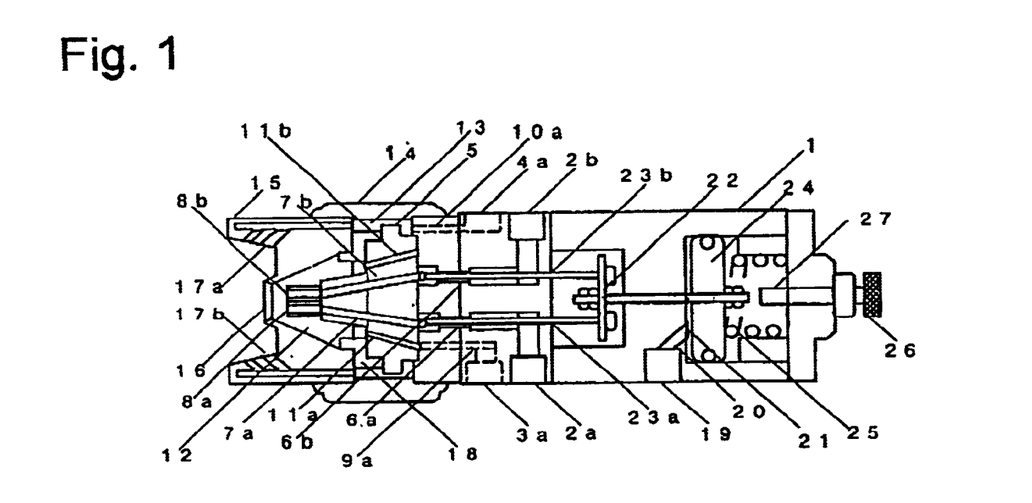
FIG. 1 is a front cross section showing one example of a multi nozzle spray gun used in the present invention.
Figure 2:
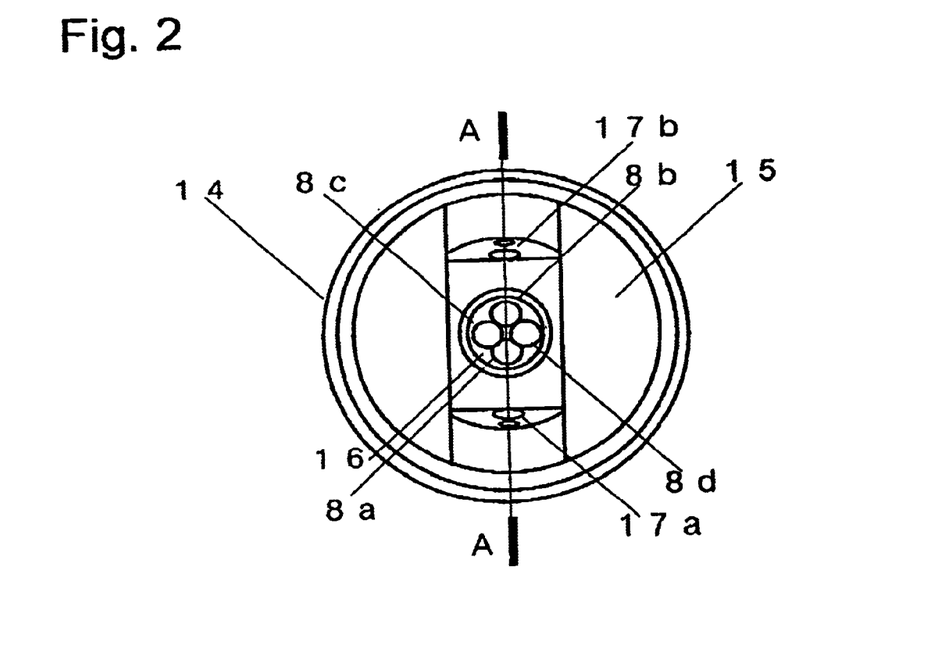
FIG. 2 is a left side face drawing showing one example of the multi nozzle spray gun used in the present invention.

FIG. 1 is a front cross section of the spray-coating apparatus, and FIG. 2 is a left side face drawing of the spray-coating apparatus. FIG. 1 is a cross section obtained by cutting it in A—A of FIG. 2 which is a left side face drawing.

In FIG. 1, the spray-coating apparatus is equipped with a gun body 1, a coating material-discharging nozzle base 5, an air cap 15 and a retaining nut 14 for combining and fixing them.

Formed in the gun body 1 are coating material-feeding ports 2 (a, b, c and d; provided that c and d are not illustrated), atomizing air-feeding ports 3 (a and b; provided that b is not illustrated), pattern air-feeding ports 4 (a and b; provided that b is not illustrated) and a pilot air-feeding port 19. Further, formed are coating material paths 6 (a, b, c and d; provided that c and d are not illustrated) from the coating material-feeding ports 2 to a left direction in FIG. 1, atomizing air paths 9 (a and b; provided that b is not illustrated) from the atomizing air-feeding ports 3 to a left direction, pattern air paths 10 (a and b; provided that b is not illustrated) from the pattern air-feeding ports 4 to a left direction and a pilot air path 20 from the pilot air-feeding port 19 to a right upper direction.

Formed in the coating material-discharging nozzle base 5 are coating material paths 7 (a, b, c and d; provided that c and d are not illustrated), atomizing air paths 11 (a, b, c and d; provided that c and d are not illustrated) and coating material-discharging nozzles 8 (a, b, c and d; provided that c and d are not illustrated). Formed in the air cap 15 are an atomizing air-blowing port 16 in a central part and pattern air-blowing ports 17 (a, b) in a horn part. The coating material-discharging nozzle base 5, the air cap 15 and a coating material-discharging nozzle position-adjusting washer are fixed by means of the retaining nut 14, whereby an atomizing air-feeding chamber 12 and a pattern air-feeding chamber 13 are formed.

In coating, the coating material paths 6 in the gun body 1 communicate with the coating material paths 7 in the coating material-discharging nozzle base, and the coating material is fed from a left end part of the coating material paths 6 in the gun body 1 to the coating material paths 7 in the coating material-discharging nozzle base and can further be discharged from the coating material-discharging nozzles 8. Atomizing air is fed from the atomizing air path 9 in the gun body 1 to a chamber communicating with the atomizing air path 11 in the coating material-discharging nozzle base, and it is introduced into the atomizing air-feeding chamber 12 through the pattern air-feeding path 11 and blown from the atomizing air-blowing port 16. The coating material discharged from the coating material-discharging nozzle 8 is turned into fine particles by blowing this atomizing air. Pattern air is fed from the pattern air path 10 in the gun body 1 to the pattern air-feeding chamber 13 and blown from the pattern air-blowing port 17. This blowing of the pattern air makes it possible to accelerate turning of the coating material particles into fine particles and enlarge a spray pattern width of the coating material.

Pilot air fed from the pilot air-feeding port 19 in the gun body 1 is fed to a closed pilot air-feeding chamber 21 formed by an inner wall of the gun body 1 and a piston 24 via a pilot air path 20. The piston 24 is pressed and moved to a right direction by feeding pilot air to the pilot air-feeding chamber 21, and the pilot air-feeding chamber 21 is expanded. This moves a needle-connecting member 22 connected to the piston 24 and needles 23 (a, b, c and d; provided that c and d are not illustrated) connected to this member 22 to a right direction. Moving of the needles 23 to a right direction allows the coating material paths 6 in the gun body 1 to communicate with the coating material paths 7 in the coating material-discharging nozzle base and makes it possible to discharge the coating material.

When pilot air is not fed, a spring 25 presses the piston 24 and the respective members interlocking with this to a left end direction, and this allows a left end of the needle 23 to shut up an aperture part at a right end of the coating material path 7 in the coating material-discharging nozzle base 5 and prevents the coating material path 6 in the gun body 1 from communicating with the coating material path 7 in the coating material-discharging nozzle base, so that the coating material is not discharged. Further, a coating material-discharging amount can be controlled by adjusting the position of a needle retraction positioning member 27 with a needle retraction adjusting screw 26.

Next, in FIG. 2, four coating material-discharging nozzles 8 (a, b, c and d) are disposed in a central part, and atomizing air is blown from the atomizing air-blowing port 16 in the periphery thereof. Further, pattern air is blown from the pattern air-blowing ports 17 (a, b). Two or more nozzles out of the four coating material-discharging nozzles are used to discharge the coating materials having different coating colors from the respective nozzles and blow atomizing air and pattern air, whereby multicolor patterns can be formed.

A mixing degree of the particles of the coating materials can be controlled by changing the configuration of the respective coating material-discharging nozzles 8 (a, b, c and d). That is, as shown in FIG. 2, the respective coating material-discharging nozzle members are brought close to such an extent that they can be brought into contact with each other, whereby a mixing degree of the particles of the coating materials discharged from the respective coating material-discharging nozzles can be increased. Separating the respective coating material-discharging nozzle members from each other decreases a mixing degree of the particles of the coating materials. A distance between the respective coating material-discharging nozzles shall not specifically be restricted, and usually the respective coating material-discharging nozzles are preferably close to each other as much as possible. A distance between the centers of the coating material-discharging nozzles falls suitably in a range of 15 mm or less, preferably 10 mm or less and more preferably 5 mm or less.

When the multi nozzle spray gun has 3 or more coating material-discharging nozzles (4 nozzles in FIG. 2), the coating materials having different coating colors may be discharged from the respective coating material-discharging nozzles or only a required number of the nozzles (for example, 2 nozzles out of 4 nozzles) may be used to spray the coating materials having different coating colors.

The multi head spray gun has 2 or more coating gun heads in the coating apparatus, and the respective coating gun heads have each one coating material-discharging nozzle. The coating material-discharging nozzles are not close to each other. The respective coating material-discharging nozzles (two or more nozzles in total) in the respective coating heads of the multi head spray gun are disposed oppositely to the coated article, and the spray patterns of the coating material particles having different colors discharged from two or more coating material-discharging nozzles are allowed to cross before striking against the coated article face to form plural color spray patterns in which the coating materials having two or more different coating colors are mixed, whereby a multicolor pattern coating film can be formed. Further, the directions of the respective nozzles in the two air spray guns are positioned and fixed so that the respective spray patterns are allowed to cross before striking against the coated article face to form plural color spray patterns, and a multicolor pattern coating film can be formed on the coated article, whereby they can be allowed to work in the same manner as that of the multi head spray gun.

The spray coating apparatus described above is used to discharge the coating material particles having at least two different colors from at least two coating material-discharging nozzles in the spray gun having two or more coating material-discharging nozzles. Formed by this are plural color spray patterns in which the coating materials discharged from the respective nozzles are present in a mixture. A mixed degree of the coating materials in the spray patterns may be determined according to the intended patterns in a range where the multicolor pattern coating film can be formed, and it can be controlled by suitably controlling the coating conditions such as a coating viscosity and a discharge amount of the coating materials. The coating material in coating has a viscosity falling suitably in a range of usually 10 to 40 seconds determined by Ford cup #4 (20° C.). An atomizing air pressure of the coating materials falls suitably in a range of usually 0.5 to 10 $kgf/cm^2$, and a pattern air pressure thereof falls suitably in a range of usually 0.1 to 4 $kgf^2$.

The shape of the unit plural color spray patterns coming from the respective coating apparatuses which are formed in the manner described above may be either round or elliptic and shall not specifically be restricted.

In the present invention, the plural unit plural color spray patterns formed from the plural spray coating apparatuses are combined to form multiple multicolor patterns in which unit multicolor patterns adjacent thereto are partially superposed. In respect to a superposing degree of the unit multicolor patterns adjacent thereto, usually a superposing width on a line connecting between the centers of the respective unit multicolor spray patterns falls suitably in a range of 1/6 to 1/2, preferably 1/3 to 1/2 of a length of the above line (when the respective unit multicolor spray patterns are circles, a diameter thereof falls in a range of 1/6 to 1/2, preferably 1/3 to 1/2 of a diameter thereof). In the present invention, a size of the unit multicolor patterns and the multiple multicolor patterns means a size of the effective spray patterns.

In forming the multicolor patterns on a coated article, the coating apparatus may be short-reciprocated (reciprocating motion in a short distance) in a lateral direction of a strip coated article, and the multiple multicolor patterns may be reciprocated in a lateral direction of the coated article. Short reciprocation makes it possible to elevate an evenness of the patterns.

In the present invention, in spray-coating to form the multicolor patterns, the coating materials are coated so that the multiple multicolor patterns continuously cover the whole width of the coated article. In short-reciprocating the coating apparatus, it is short-reciprocated so that the multiple multicolor patterns continuously cover the whole width of the coated article.

A coating amount of the multicolor pattern layer formed on the coated article shall not specifically be restricted, and it falls suitably in a range of 0.5 to 120 g/m$^2$, preferably 1 to 80 g/m$^2$ in terms of a coating material solid matter from the viewpoints of the appearance of the resulting pattern coating film and popping (foaming) on the coating film in baking.

In the process of the present invention, capable of being given as the strip coated article are, for example, metal plates, coated metal plates prepared by forming a primer coating film on the above metal plates and, if necessary, further forming a color protective layer on the above primer coating film, and plastic sheets. Among them, the metal plates and the coated metal plates can suitably be used. Capable of being given as the metal plates described above are cold rolled steel plates, zinc-plated steel plates, aluminum-plated steel plates and aluminum plates. Among them, the zinc-plated steel plates can suitably be used. Capable of being given as the zinc-plated steel plates are molten zinc-plated steel plates, electrolytic zinc-plated steel plates, iron-zinc alloy-plated steel plates, nickel-zinc alloy-plated steel plates and aluminum-zinc alloy-plated steel plates (for example, plated steel plates having the brand names of "Galvalium" and "Galfan"). Further, the metal plates described above may be subjected to chemical conversion treatment such as zinc phosphate treatment and chromate treatment in order to elevate the adhesion property and the corrosion resistance.

When the coated article is a coated metal plate, a primer coating film which may be formed on the metal plate described above is suitably a coating film obtained from a polyester base primer or an epoxy resin base primer. A film thickness thereof shall not specifically be restricted and falls preferably in an extent of usually 2 to 10 μm in terms of a cured (dried) coating film thickness. An intermediate coating film and a finish base coating film can be coating films formed from intermediate coating materials and finish base coating materials which have so far been publicly known in the coating material field. Coating materials such as a polyester resin base, an alkyd resin base, an acrylic resin base and a silicon polyester resin base can be given as both of the intermediate coating material and finish base coating material.

A moving speed of the coated article shall not specifically be restricted and falls suitably in a range of usually 10 m/minute or more, preferably 10 to 150 m/minute and more preferably 20 to 80 m/minute from the viewpoints of the productivity and the coated face state.

Figure 3:
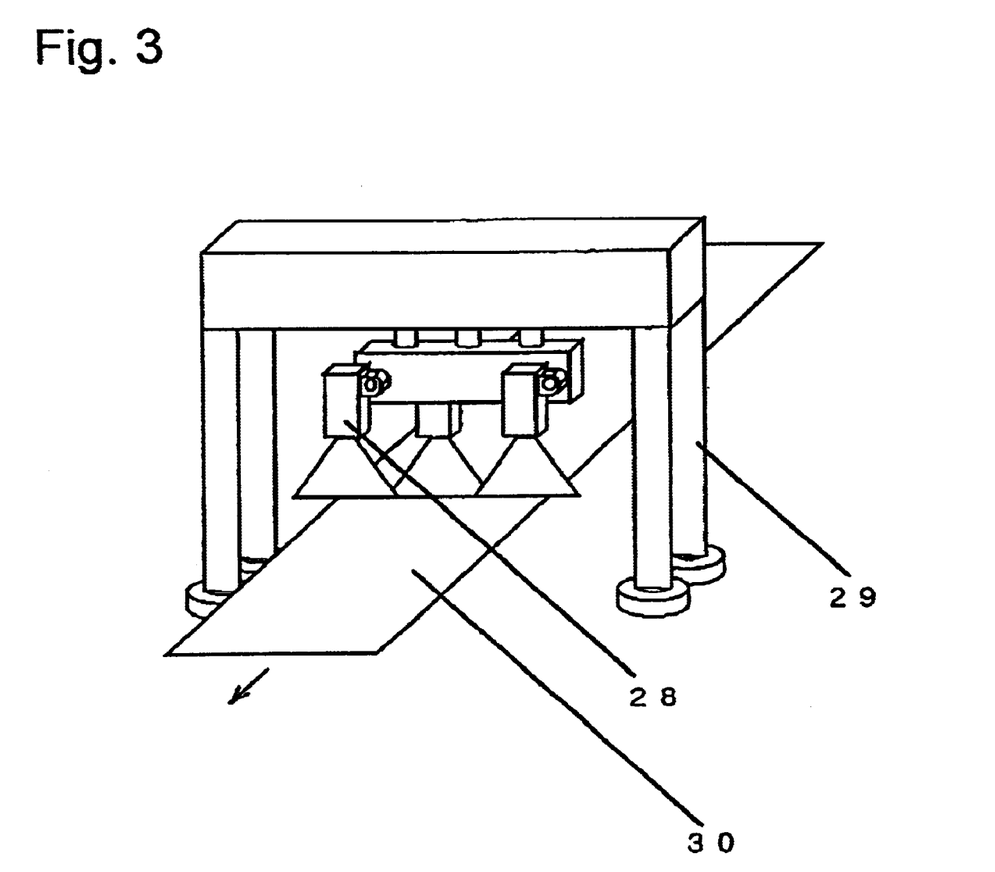
FIG. 3 is a schematic drawing showing one example of the multicolor pattern-forming process of the present invention.

One example of the process of the present invention shall be explained based on FIG. 3.

In FIG. 3, three multi nozzle guns 28 mounted on a coating gun-fixing holder 29 are used to superpose three unit plural color spray patterns formed by the three multi nozzle guns on a primer-coated steel plate 30 which is a coated article and on which a primer coating film is formed, whereby multiple multicolor patterns are formed. The three multi nozzle guns 28 are constituted so that they can be short-reciprocated (reciprocating motion in a short distance), if necessary, at the same time in a lateral direction of the coated article. The primer-coated steel plate on which a multicolor pattern coating film is formed is then baked to cure the multicolor pattern coating film.

The baking condition of the multicolor pattern coating film shall not specifically be restricted, and when coating continuously, it is suitably 30 seconds to 2 minutes on the condition of a maximum reachable temperature of 160 to 250° C. of the coated article.

The present invention shall more specifically be explained with reference to production examples and examples. Hereinafter, both "part" and "%" shall be based on weight.

PRODUCTION EXAMPLE 1

Mixed with 3.2 parts of a mixture of 1.0 part of dodecylbenzenesulfonic acid and 2.2 parts of n-dibutylamine was 300 parts of a white coating material base obtained by mixing and dispersing 133 parts of a solid matter 60% resin solution of an oil-free polyester resin having a weight average molecular weight of 20,000 and a hydroxyl group value of 15 mg KOH/g, 20 parts of Cymel 303 (low nuclidic methylated melamine resin manufactured by Mitsui Cytec Co., Ltd.), 90 parts of a titan white pigment, 3 parts of silica fine powder having an average particle diameter of about 2 μm and 54 parts of a mixed solvent A (remark 1). Further, the mixed solvent A was added thereto and uniformly stirred to obtain a white coating material-1 having a viscosity of 20 seconds at 25° C. in terms of a Ford cup #4.

(Remark 1) mixed solvent A: mixed solvent of Swasol 1000 (high boiling aromatic hydrocarbon base solvent manufactured by Cosmo Oil Co., Ltd.)/xylene/cyclohexanone=50/30/20 (weight ratio)

PRODUCTION EXAMPLES 2 to 11

The same oil-free polyester resin solution as used in Production Example 1 was used to obtain the respective white coating materials having a viscosity of 20 seconds at 25° C. in terms of a Ford cup #4 in the same manner as in Production Example 1, except that the blend composition in Production example 1 was changed as shown in the following Table 1 and that the sulfonic acid compounds and the amine compounds were blended by methods shown in the following Table 1. The coating materials obtained in Production Examples 9 to 11 were comparative examples.

TABLE 1

| | Production Example | | | | | | | | | | |
|---|---|---|---|---|---|---|---|---|---|---|---|
| Coating material name | 1 White coating material-1 | 2 Black coating material-2 | 3 Blue coating material-3 | 4 White coating material-4 | 5 Black coating material-5 | 6 White coating material-6 | 7 Black coating material-7 | 8 Blue coating material-8 | 9 White coating material-9 | 10 Black coating material-10 | 11 Blue coating material-11 |
| 60% Oil-free polyester resin solution | 133 | 133 | 133 | 133 | 133 | | | | 133 | 133 | 133 |
| 60% Acrylic resin solution | | | | | | 117 | 117 | 117 | | | |
| Cymel 303 | 20 | 20 | 20 | 20 | 20 | 30 | 30 | 30 | 20 | 20 | 20 |
| Titan white pigment | 90 | | | 90 | | 90 | | | 90 | | |
| Carbon black pigment | | 8 | | | 8 | | 8 | | | 8 | |
| Cyanine blue pigment | | | 25 | | | | | 25 | | | |
| Silica fine powder | 3 | 3 | | 3 | | 3 | 3 | 3 | 30 | 30 | 30 |
| Polyacrylonitrile fine particle (*2) | | | | 7 | | 5 | | | | | |
| Polyamide fine particle (*3) | | | | | 6 | | 8 | | | | |
| Hollow glass bead (*4) | | | 5 | | | 5 | | | | | |
| Dodecylbenzene-sulfonic acid | 1.0 | 1.0 | | 1.0 | 1.0 | | 1.0 | 1.0 | | | |
| Paratoluene-sulfonic acid | | | 1.4 | | | 1.4 | | | | | |
| n-Dibutylamine | 4.0 | 4.0 | | | | | 8.0 | 8.0 | | | |
| Diisopropylamine | | | 5.8 | | | 11.6 | | | | | |
| Triethylamine | | | | 3.1 | 3.1 | | | | | | |
| Mole ratio of amine compound/sulfonic acid compound | 10 | 10 | 7 | 10 | 10 | 14 | 20 | 20 | | | |
| Blending method of amine compound and sulfonic acid compound | mixed in advance | mixed in advance | mixed in advance | separately mixed | separately mixed | mixed in advance | separately mixed | separately mixed | | | |
| Mixed solvent A | α | α | α | α | α | α | α | α | α | α | α |

EXAMPLE 1

The white coating material-1 obtained in Production Example 1 and the black coating material-2 obtained in Production Example 2 were used as the coating materials.

Coating was carried out by a method shown in FIG. 3, that is, a coating method using four multi nozzle guns. Used as the coated article was a primer-coated zinc-plated steel plate (shown by "coated article A" in Table 2 described later) having a plate width of 80 cm prepared by coating KP Color 845 Primer (epoxy resin base primer, manufactured by Kansai paint Co., Ltd.) in a dried film thickness of about 5 μm and baking. A moving speed (line speed) of the coated article was set to 40 m/minute.

A gun which had four nozzles and in which the members of the nozzles were bought into contact with each other (distance between the nozzles: 4 mm) was used as the respective multi nozzle guns, and two nozzles out of four nozzles were used. In discharging two kinds of the coating materials of the white coating material-1 and the black coating material-1 each described above from two nozzles to carry out coating, a distance from the nozzle tip to the coated article surface was set to 40 cm, and the respective unit multicolor patterns having an effective pattern width of 40 cm were formed to form multiple multicolor patterns so that the adjacent spray patterns were superposed each other by ⅓ of a diameter of the spray patterns, whereby coating was carried out.

In the respective multi nozzle guns, an atomizing air pressure was set to 1.5 kgf/cm², a pattern air pressure was set to 1.5 kgf/cm²; and a discharging amount of the coating materials from the respective multi nozzle guns was set to 250 ml/minute in both cases of the white coating material and the black coating material each described above. The coating materials were coated in the manner described above and baked for 45 seconds on the condition that the material reachable maximum temperature was 220° C. to form an even and fine shrunk matted multicolor pattern coating film having a coated amount of about 40 g/m² (dried film thickness: about 10 μm) of the dried coating film on the surface of a primer-coated zinc-plated. steel plate.

EXAMPLE 2

The white coating material-4 obtained in Production Example 4 and the black coating material-5 obtained in Production Example 5 were used as the coating materials.

Used as the coated article was a coated steel plate (shown by "coated article B" in Table 2 described later) prepared by further coating and baking KP Color 1573 White Enamel (polyester-melamine resin base white coating material, manufactured by Kansai paint Co., Ltd.) in about 18 μm on a primer-coated zinc-plated steel plate prepared by coating and baking KP Color 845 Primer in a dried film thickness of about 5 μm.

A moving speed (line speed) of the coated article was set to 40 m/minute. Patterns were coated in the same manner as in Example 1, except that in Example 1, the coated article B was used as the coated article and the plate width was changed to 60 cm and that four dual head guns were substituted for four multi nozzle guns.

The respective dual head guns are constituted so that the white spray patters and the black spray patters can be crossed to form a pattern coating film on a roll surface. In discharging two kinds of the white and black coating materials each described above from the respective dual head guns, a distance from the nozzle tip to the roll surface was set to 70 cm, and the coating materials were coated so that the respective unit multicolor patterns having an effective pattern width of 40 cm were formed and the adjacent unit multicolor patterns were superposed each other by ½ of a diameter of the spray patterns. Further, the four dual head guns were short-reciprocated at the same time in a distance of 15 cm in a lateral direction of the coating roll during coating.

In the respective dual head guns, an atomizing air pressure of the coating materials was set to 2.5 kgf/cm$^2$; a pattern air pressure was set to 1.5 kgf/cm$^2$; and a discharging amount of the coating materials from the respective nozzles was set to 250 ml/minute in both cases of the white coating material and the black coating material each described above. The coating materials were coated in the manner described above and baked for 45 seconds on the condition that the material reachable maximum temperature was 220° C., whereby an even and fine shrunk matted multicolor pattern coating film having a coated amount of about 40 g/m$^2$ (dried film thickness: about 10 μm) of the dried coating film was formed on the surface of a coated zinc-plated steel plate in which a white enamel was coated on a primer.

EXAMPLES 3 and 4

The same operation as in Example 1 was carried out to form even and fine shrunk matted multicolor pattern coating films having a coated amount of about 40 g/m$^2$ (dried film thickness: about 10 μm) of the dried coating film on the coated article, except that the kind of the coated article, the plate width, the kind of the coating material used and the use number of the nozzles in the gun were changed as shown in Table 2 described later.

COMPARATIVE EXAMPLES 1 and 2

The same operation as in Example 1 was carried out to form matted multicolor pattern coating films having a coated amount of about 40 g/m$^2$ (dried film thickness: about 10 μm) of the dried coating film on the coated article, except that the kind of the coated article, the plate width, the kind of the coating material used and the use number of the nozzles in the gun were changed as shown in Table 2 described later.

The coated steel plates obtained in Examples 1 to 4 and Comparative Examples 1 and 2 each described above on which the matted multicolor pattern coating films were formed were evaluated according to the following test methods.

Test Methods
Coating Film Appearance

When nothing abnormal was observed and matted appearance was good, it was marked with good (○). 60 degree specular gloss:

A specular gloss (60 degrees) was determined according to JIS K5400 7.6 (1990).

Color-transfer Resistance

Four gauzes were wound in layers around a finger, and the surface of the coated article was rubbed therewith to visually observe an extent of coloring on the gauze:

○: not coloring on the gauze

Δ: coloring a little on the gauze

X: coloring fairly or markedly on the gauze

Oil-based Ink Stain Resistance

A line was drawn on the coated surface with a red oil-based ink in a room of 20° C. and wiped off with a gauze soaked with n-butanol after left standing for one hour. The appearance of the trace of the red ink after wiped off was visually evaluated. The appearance was visually evaluated according to the following criteria:

◎: no trace is observed

○: a little trace is observed

Δ: trace fairly remains

X: trace densely remains

Accelerated Weather Resistance

The test was carried out for 1,000 hours by means of a sunshine weatherometer. The coating film appearance of the coated plate after the test was visually compared with the coating film appearance of the non-tested coated plate and judged according to the following criteria:

○: difference between both coated plates is small and good

Δ: difference between both coated plates is fairly observed and a little inferior X: difference between both coated plates is large and inferior

TABLE 2

|  | Example | | | | Comparative Example | |
| --- | --- | --- | --- | --- | --- | --- |
|  | 1 | 2 | 3 | 4 | 1 | 2 |
| Kind of coated article | Coated article A | Coated article B | Coated article A | Coated article B | Coated article A | Coated article B |
| Width of coated article | 80 cm | 60 cm | 80 cm | 80 cm | 80 cm | 80 cm |
| Coating material used | White coating material-1 Black coating material-2 | White coating material-4 Black coating material-5 | White coating material-6 Black coating material-7 Blue coating material-8 | White coating material-1 Black coating material-2 Blue coating material-3 | White coating material-9 Black coating material-10 | White coating material-9 Black coating material-10 Blue coating material-11 |
| Kind of spray gun | Multi nozzle gun | Dual head gun | Multi nozzle gun | Multi nozzle gun | Multi nozzle gun | Multi nozzle gun |

TABLE 2-continued

| | Example | | | | Comparative Example | |
|---|---|---|---|---|---|---|
| | 1 | 2 | 3 | 4 | 1 | 2 |
| Use number of nozzle in gun | 4 nozzles | — | 3 nozzles | 3 nozzles | 4 nozzles | 3 nozzles |
| Number of gun | 4 guns | 4 guns | 4 guns | 4 guns | 4 guns | 4 guns |
| Film thickness of pattern coating film | 10 μm | 10 μm | 10 μm | 10 μm | 10 μm | 10 μm |
| Coating film appearance | ○ | ○ | ○ | ○ | ○ | ○ |
| 60 degree specular gloss | 2.0–2.5 | 2.0–2.5 | 1.5–2.0 | 2.0–2.5 | 5.0–6.0 | 5.0–6.0 |
| Color-transfer resistance | ○ | ○ | ○ | ○ | X | X |
| Oil-based ink stain resistance | ⊚ | ⊚ | ⊚ | ⊚ | X | X |
| Weather resistance | ○ | ○ | ○ | ○ | X | X |

As described above, according to the present invention, even if a moving speed of the coated article is accelerated, a non-coated part is not produced on the coated article, and capable of being formed is a matted multicolor pattern coating film which has small scattering in a coated film thickness and is even and excellent in decorativeness and which is excellent in a color-transfer resistance, a stain resistance against oil-based inks and a weather resistance.

What is claimed is:

1. A process for forming a shrunk matted multicolor pattern coating film having a 60 degree specular gloss of 10 or less determined according to JIS K5400 7.6 (1990) by spray-coating and baking plural coating materials having different colors on a moving strip coated article, wherein the above plural coating materials are shrunk matted coating film-forming coating materials each comprising:
a resin composition containing
(A) 60 to 95 parts by weight of a hydroxyl group-containing organic resin and
(B) 5 to 40 parts by weight of a low nuclidic methylated melamine resin in such a proportion that the amounts of these both components sum up to 100 parts by weight,
(C) a reaction mixture of 1 mole of a sulfonic acid compound and 1.5 mole or more of at least one amine compound having a boiling point falling in a range of 30 to 250° C. and selected from secondary amines and tertiary amines in an amount of 0.1 to 3 parts by weight in terms of an amount reduced to the above sulfonic acid compound per 100 parts by weight of the above resin composition, and
(D) a color pigment; and
in carrying out spray coating,
(i) two or more spray-coating apparatuses having two or more coating material-discharging nozzles are used, and the respective coating material-discharging nozzles are disposed toward a coated article face;
(ii) coating materials having coating colors which are different from each other are discharged from at least two coating material-discharging nozzles of the above respective spray-coating apparatuses to form a plural number of unit plural color spray patterns in which the above coating materials having different coating colors are present in a mixture; and
(iii) thus, the respective unit multicolor patterns constituted by a plural number of the above unit plural color spray patterns are partially superposed on unit multicolor patterns constituted by unit plural color spray patterns adjacent thereto on the coated article to form multiple multicolor patterns covering the whole width of the coated article.

2. The process as described in claim 1, wherein the hydroxyl group-containing organic resin (A) is a polyester resin having a hydroxyl group value of 5 to 110 mg KOH/g.

3. The process as described in claim 1, wherein the low nuclidic methylated melamine resin (B) is a melamine resin having substantially no NH group and an average condensation degree of 2.5 or less and containing 4 or more alkoxy groups on average per one triazine nucleus and among them, 2.5 or more methoxy groups.

4. The process as described in claim 1, wherein the above resin composition contains:
(A) 70 to 92 parts by weight of the hydroxyl group-containing organic resin and
(B) 8 to 30 parts by weight of the low nuclidic methylated melamine resin based on 100 parts by weight of the total amount of the component (A) and the component (B).

5. The process as described in claim 1, wherein the sulfonic acid compound is selected from the group consisting of dodecylbenzenesulfonic acid, dinonylnaphthalenedisulfouic acid, dinonylnaphthalenesulfonic acid, paratoluenesulfonic acid and methanesulfonic acid.

6. The process as described in claim 1, wherein the amine compound has a boiling point falling in a range of 50 to 230° C.

7. The process as described in claim 1, wherein the amine compound is selected from the group consisting of dimethyloxazolidine, diisopropylamine, di-n-propylamine, di-n-butylamine and diisobutylamine.

8. The process as described in claim 1, wherein the reaction mixture (C) is the reaction mixture of 1 mole of the sulfonic acid compound and 4 to 30 mole of the amine compound.

9. The process as described in claim 1, wherein the coating material contains 0.2 to 2 parts by weight of the reaction mixture (C) in terms of an amount reduced to the sulfonic acid compound per 100 parts by weight of the above resin composition.

10. The process as described in claim 1, wherein the coating material contains 5 to 120 parts by weight of the color pigment (D) per 100 parts by weight of the above resin composition.

11. The process as described in claim 1, wherein the coating material further comprises silica fine powder.

12. The process as described in claim 1, wherein the coating material further comprises an aggregate.

13. The process as described in claim 1, wherein the strip coated article moves at a speed of 10 m/minute or more.

14. The process as described in claim 1, wherein the strip coated article is a strip metal plate on which a primer coating film is formed.

15. The process as described in claim 1, wherein the strip coated article is one prepared by forming in order a primer coating film on a strip metal plate and a color protective coating film on the primer coating film.

16. The process as described in claim 1, wherein plural spray coating apparatuses are fixed.

17. The process as described in claim 1, wherein spray coating is carried out while reciprocating the plural spray coating apparatuses at the same time in a short distance in the same direction.

18. The process as described in claim 1, wherein the spray coating apparatus is a multi nozzle spray gun having two or more coating material-discharging nozzles which are close to each other.

19. A matted multicolor pattern coating film-formed coated plate obtained by the process for forming a multicolor pattern coating film as described in claim 1.

* * * * *